United States Patent
Finster et al.

(10) Patent No.: US 12,481,766 B2
(45) Date of Patent: Nov. 25, 2025

(54) VETTING AND/OR FUNCTIONAL VALIDATION OF SOFTWARE COMPONENTS

(71) Applicant: ABB Schweiz AG, Baden (CH)

(72) Inventors: Soeren Finster, Karlsruhe (DE); Thomas Gamer, Brühl (DE); Florian Kohnhaeuser, Riedstadt (DE); Nicolas Coppik, Darmstadt (DE); Piotr Powroznik, Zielonki (PL)

(73) Assignee: ABB Schweiz AG, Baden (CH)

( * ) Notice: Subject to any disclaimer, the term of this patent is extended or adjusted under 35 U.S.C. 154(b) by 118 days.

(21) Appl. No.: 18/533,573

(22) Filed: Dec. 8, 2023

(65) Prior Publication Data

US 2024/0193279 A1    Jun. 13, 2024

(30) Foreign Application Priority Data

Dec. 9, 2022    (EP) .................................... 22212579

(51) Int. Cl.
*G06F 21/57*    (2013.01)

(52) U.S. Cl.
CPC ...... *G06F 21/577* (2013.01); *G06F 2221/033* (2013.01)

(58) Field of Classification Search
CPC .. G06F 21/577; G06F 2221/033; G06F 21/16; G06F 21/645; G06F 21/57; G06F 11/3604; G06F 21/6218; H04L 9/50
See application file for complete search history.

(56) References Cited

U.S. PATENT DOCUMENTS

| | | | |
|---|---|---|---|
| 2019/0004789 A1* | 1/2019 | Mills | H04L 9/3239 |
| 2020/0007343 A1* | 1/2020 | Evans | H04L 9/0643 |
| 2020/0099513 A1 | 3/2020 | Angelo et al. | |
| 2021/0256113 A1 | 8/2021 | Scott et al. | |

OTHER PUBLICATIONS

Github, "in-toto Attestation Framework," downloaded from the Internet on Nov. 16, 2023, at https://github.com/in-toto/attestation, 3 pp. (2023).
Ross et al., "Sicher verkettet: Vollstaendiges Erfassen der Software Supply Chain im IoT," *heise Developer*, 22 pp. (Apr. 20, 2022).
Sigstore, "Sigstore Overview," downloaded from the Internet on Nov. 20, 2023, at https://www.sigstore.dev/, 4 pp. (2023).

* cited by examiner

*Primary Examiner* — El Hadji M Sall
(74) *Attorney, Agent, or Firm* — Leydig, Voit & Mayer, Ltd.

(57) ABSTRACT

A computer-implemented method for providing vetting and/or functional validation of software components, comprising: providing a software component and software component data indicating the software component; writing the software component data in a distributed ledger; functional validating and/or vetting the software component and providing functional validation and/or vetting data of the software component; writing the functional validation and/or vetting data in the distributed ledger; providing the data written in the distributed ledger to a software component consumer.

14 Claims, 2 Drawing Sheets

VETTING AND/OR FUNCTIONAL VALIDATION OF SOFTWARE COMPONENTS

CROSS-REFERENCE TO RELATED APPLICATIONS

The instant application claims priority to European Patent Application No. 22212579.1, filed Dec. 9, 2022, which is incorporated herein in its entirety by reference.

FIELD OF THE DISCLOSURE

The present disclosure relates to a computer-implemented method for providing vetting and/or functional validation of software components and to a system for providing vetting and/or functional validation of software components.

BACKGROUND OF THE INVENTION

The general background of this disclosure is the providing of vetting and/or functional validation of a software component.

Commercial software components or solutions used in private as well as business/industrial context are typically delivered by a provider to a customer, potentially including some functional or security guarantees as agreed in the contracting or licensing. Additionally, the software component or solution might be signed by provider in order to ensure correctness of the software component or solution. A common way to check the correctness of signatures is implemented by operating system vendors, e.g., Microsoft, Apple, Google, in their own security ecosystem, e.g., Apple Gatekeeper, Google Play Store. Actually, checking for correctness of signatures through a customer without support and enforcement from operating systems and security ecosystems is uncommon. Vetting, i.e., providing of security testing and guarantees, is still rather the exception than common today. One reason for this is that vetting itself as well as documenting the process and result of vetting for a software component or solution used in, e.g., an industrial automation system such as an HMI (human-machine interface) or DCS (distributed control system), is a complex and time-consuming process. This is even more true for data as a "component", e.g., of a process control or optimization algorithm, i.e., validating data source for integrity, correctness, and authenticity, and documenting the results, e.g., for post-failure auditing, is rarely done today and highly time-consuming. Functional testing—as another aspect similar to security-focused vetting—is more common in industrial context today. Typically, such functional testing is done by the vendor/provider of a software component, and documentation of the functional testing is handed over to customer/user along with the actual software component as part of the contractual delivery.

BRIEF SUMMARY OF THE INVENTION

Hence, there is a need to provide a vetting and/or validation of a software component such that a software component user can easily check authenticity and correctness of the component easily in a highly available, secure, verifiable, and immutable way.

In one aspect of the disclosure, a computer-implemented method for providing vetting and/or functional validation of software components is presented, comprising: providing a software component and software component data indicating the software component; writing the software component data in a distributed ledger; functional validating and/or vetting the software component and providing functional validation and/or vetting data of the software component; writing the functional validation and/or vetting data in the distributed ledger; and providing the data written in the distributed ledger to a software component consumer.

BRIEF DESCRIPTION OF THE SEVERAL VIEWS OF THE DRAWING(S)

DETAILED DESCRIPTION OF THE INVENTION

Figure 1:
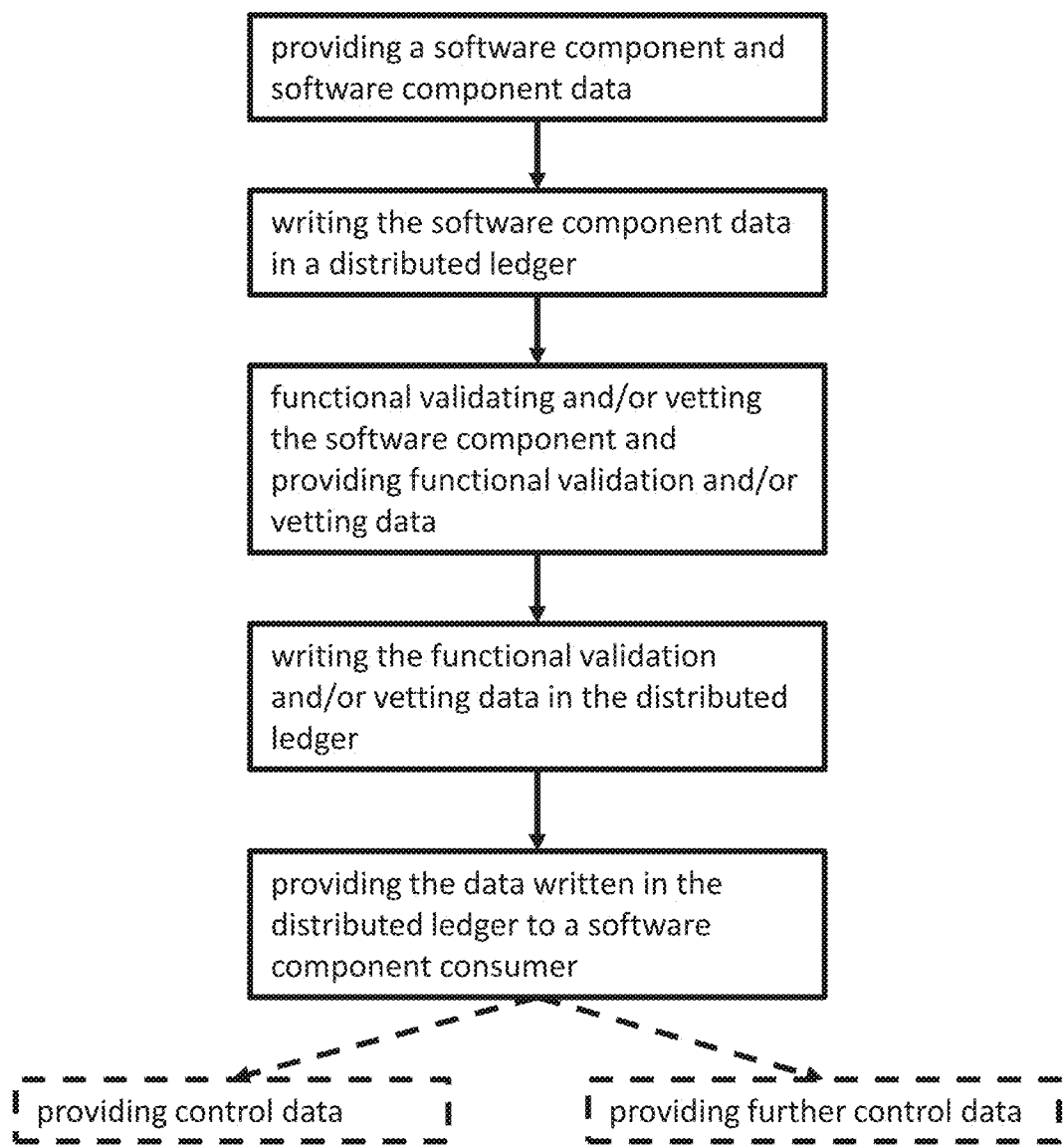
FIG. 1 is a flowchart for a computer-implemented method for providing vetting and/or functional validation of software components in accordance with the disclosure.

FIG. 1 illustrates flow diagram of a computer-implemented method for providing vetting and/or functional validation of software components. In a first step a software component and software component data indicating the software component is provided. The software component is provided as a zip-file and the software component data include the name of the software component and a secure way to identify the software component. In a second step, the software component data are written in a distributed ledger. The distributed ledger is a public distributed ledger. In a third step the software component is functional validated and/or vetted and functional validation and/or vetting data of the software component are provided. The functional validation and/or vetting data include the result of the functional validation and/or vetting. In a fourth step, the functional validation and/or vetting data are written in the distributed ledger. In a fifth step the data written in the distributed ledger are provided to a software component consumer. The software component consumer may use the functional validation and/or vetting data for building an industrial control application. Further, the consumer can provide a quality analysis with respect to election and reliability of the software component based on the immutable, verifiable, available information in the public ledger. Further, the software component consumer can create additional trust factors used internally, e.g., if more details are available on setup and results, the trust into the vetting result is higher. Furthermore, a consumer can also use the information to check software components that are already in use. For example, it is possible to periodically search the public ledger for new vetting results about all software components that are already in use. By searching for hashes of distribution formats (e.g., zip archives), a consumer can monitor for new publications of already existing software components.

Optionally, the computer-implemented method further comprises the step of providing control data for controlling at least one process of an industrial control application and/or providing the industrial control application, an operator human machine interface, HMI, for handling alarms and/or an optimization of production parameters based on the provided data written in the distributed ledger.

Optionally, the computer-implemented method further comprises the step of providing, when the software component data includes specific instance information, further control data based on the data written in the distributed ledger for controlling a providing of a software solution.

Figure 2:
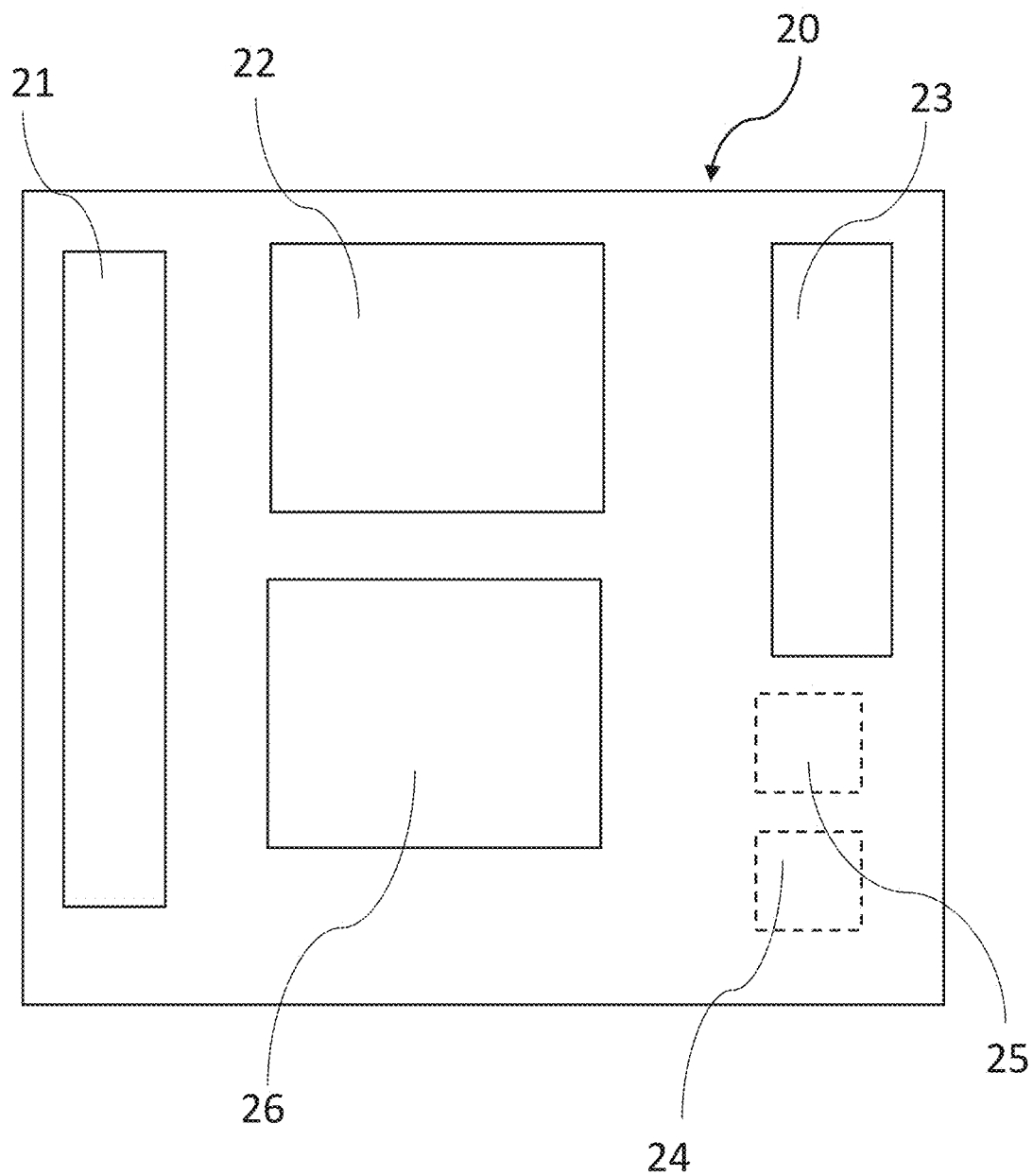
FIG. 2 is a block diagram of an exemplary embodiment of a system for providing vetting and/or functional validation of software components in accordance with the disclosure.

FIG. 2 illustrates an example embodiment of a system for providing vetting and/or functional validation of software components. The system 20 comprises a first providing unit 21 providing a software component and software component data indicating the software component. The system further comprises a distributed ledger 22, a first writing unit for writing the software component data in a distributed ledger, a functional validating and/or vetting unit 26 for functional validating and/or vetting the software component and providing functional validation and/or vetting data of the software component, and a second writing unit for writing the functional validation and/or vetting data in the distributed ledger. Further, the system comprises a providing unit 23 for providing the data written in the distributed ledger to a software component consumer.

Optionally, the industrial control system 20 may further comprise a control data providing unit 24 for providing control data for controlling at least one process of an industrial control application and/or providing the industrial control application, an operator human machine interface, HMI, for handling alarms and/or an optimization of production parameters based on the provided data written in the distributed ledger.

Optionally, the industrial control system 20 may further comprise a control data providing unit 25 for providing further control data for providing a software solution.

The present disclosure has been described in conjunction with a preferred embodiment as examples as well. However, other variations can be understood and effected by those persons skilled in the art and practicing the claimed invention, from the studies of the drawings, this disclosure, and the claims. Notably, in particular, the any steps presented can be performed in any order, i.e., the present invention is not limited to a specific order of these steps. Moreover, it is also not required that the different steps are performed at a certain place or at one node of a distributed system, i.e., each of the steps may be performed at a different node using different equipment/data processing units.

In the claims as well as in the description the word "comprising" does not exclude other elements or steps and the indefinite article "a" or "a" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The term vetting as used herein is to be understood broadly and represents any method for providing security testing and guarantees. For instance, vetting of a software may be performing security assurance, code reviews, fuzzing, testing against known vulnerabilities, checking dependencies (e.g., 3rd party libraries) for known vulnerabilities, and/or validating default configurations (e.g., regarding open ports, authentication enabled, etc.), but are not limited thereto.

The term functional validation as used herein is to be understood broadly and represents any method for providing application features testing. For instance, functional validation may be classical software test procedures such as unit testing or functional testing but are not limited thereto.

The term software component as used herein is to be understood broadly and represents any component of a software. For instance, a software component may be any component being provided as a cloud application, running on-site on an edge system or server, or running in an end device, but are not limited thereto. Additionally, or alternatively, software components can be stand-alone tools as well as components of larger tools, such as HMI widgets, software libraries, operating systems, etc. The software components may be published in source code form, compiled form, intermediary form, but are not limited thereto. Further, the software components can be solely data, in particular, generic data, sensor data in critical environments and/or input data to machine learning algorithms, but is not limited thereto, wherein the data can be original data or pre-processed data. The software component can be provided in a distribution format, like a zip archive, of the software component. By providing the software component as a zip archive, in particular a zip archive having a code signing or password protection, the ability of the publisher to alter the software component after providing and possible vetting is reliably prevented. It also allows users of the vetting information to identify software at hand and search for fitting publication and vetting records on the ledger.

The term software component data as used herein is to be understood broadly and represents any data providing mandatory input information of a software component. The software component data may be the name of the component, the vendor's name, the software version, or further generic information like versioning scheme and/or release cycles but are not limited thereto. Alternatively, or additively, the software component data may be a pointer to further relevant information such as product website, download link, but are not limited thereto. The pointer may be any item pointing to specific information being stored in a database. The pointer may be a path indicating where, i.e., at which database or databases, the specific information of the software component is stored.

The term distributed ledger as used herein is to be understood broadly and represents any ledger of the distributed ledger technology or other technology that achieves consensus over replicated, shared, and synchronized data. The distributed leger technology includes a plurality of different type. Exemplary types are DAG (Directed Acyclic Graph), like IOTA, Blockchain, and Hybride, but are not limited thereto. The distributed ledger is formed by nodes, wherein the nodes, in particular all of the nodes, run a ledger platform, defines the execution environment, provide rules and processes for creating, maintaining, and validating the ledger, as well as technologies to implement the ledger, but are not limited thereto. The execution environment may be public ledgers, private ledgers, hybrid ledgers, or even central solutions exposing the same characteristics as distributed ledger technologies, but are not limited thereto. The rules and processes for creating, maintaining, and validating the ledger may comprise block and transaction formats, block creation, and consensus process, but are not limited thereto. The technologies to implement the ledger may comprise hash algorithms, public/private key algorithms, and consensus algorithm, but are not limited thereto.

The term writing data into the distributed ledger as used herein is to be understood broadly and comprises the typically steps of the distributed ledger technology: providing data to be written into a distributed ledger to nodes a distributed ledger, selecting at least one of the nodes of a distributed ledger to write a transaction into the distributed ledger, wherein the writing a transaction into the distributed ledger is authorized by the selected at least one of the nodes of the distributed ledger. The transaction comprises transaction data which indicate the data to be written in the distributed ledger.

The term functional validation and/or vetting data as used herein is to be understood broadly and represents any data providing and/or indicating the results of the functional validation and/or vetting of the software component. The functional validation and/or vetting data may be provided as a text, string, structured document of validation/vetting results, or test specifications but are not limited thereto. The functional validation and/or vetting data may comprise identifying information of the validated and/or vetted software component, e.g., version number, as well as the vetting result. Besides, a link to the software component entry created by the software vendor is another element, which could be implemented, for instance, by adding the hash of the transaction that added the new software component to the ledger. Further information that might be relevant is the name of the organization or company etc. that performed the vetting. Along with the vetting and/or functional validation result, data could include a pointer to further relevant information such as detailed vetting setup including e.g., description of test system, vetting parameters, device configurations, specifications of performed vetting procedures, detailed vetting results. The vetting results may include success/failure information, intermediate outputs, or related vulnerabilities identified during vetting, e.g., by linking to respective CVEs.

The term software component consumer as used herein is to be understood broadly and represents any natural person and/or system using the software component. Exemplary, the software component consumer may be a user of the software component but is not limited thereto. The software component consumer is capable to use, query, receive not only the data of one functional validation and/or vetting, but also from a plurality, i.e., at least two, of different functional validation and/or vetting methods and processes at the same time.

The separation of the providing of the software component and the execution of functional validation and/or vetting leads to the possibility that a software component user can check authenticity and correctness (functional and/or security) of the component easily in a highly available, secure, verifiable, and immutable way. Further, the use of the distributed ledger technology leads to a providing of a solution without a central authority such that a good fit to the active open-source community driving software development can be provided.

In an embodiment of the method for providing vetting and/or functional validation of software components, the software component data includes identification information and/or specific instance information.

The term identification information as used herein is to be understood broadly and represents any information indicating the software components. For instance, the indication information may be the name of the software components, the version number, a hash of the software component itself, but are not limited thereto.

The term specific instance information as used herein is to be understood broadly and represents any information respectively data indicating/providing how the specific software component can be used in the development of a further software solution. Further, the specific instance information may comprise information about/data indicating the properties, the compatibility, the system requirements etc. of the software component. The specific instance information may be presented/provided by a hash sum but are not limited thereto.

In an embodiment of the method for providing vetting and/or functional validation of software components, the steps of providing a software component and software component data indicating the software component, and writing software component data in a distributed ledger are executed by a first person and the steps of functional validating and/or vetting the software component and providing functional validation and/or vetting data of the software component, and writing functional validation and/or vetting data in the distributed ledger are executed by at least one second person.

The term person as used herein is to be understood broadly and represents any person bearing their own rights and obligations. For instance, a person may be a natural person, a legal person, or a company.

The term first person as used herein is to be understood broadly and represents the person which provides and/or publishes the software component. Exemplary, the first person may be the provider of the software component.

The term second person as used herein is to be understood broadly and represents any person which functional validates and/or vets the software component. For instance, the second person may be at least one component validator and/or user but are not limited thereto. The second person can be a single component validator and/or user or a plurality of component validators and/or users. The second person may be different to the first person.

By an execution of the steps of the functional validating and/or vetting, providing functional validation and/or vetting data, and writing functional validation and/or vetting data in the distributed ledger by at least one second person, vetting and/or functional validation of the software components can be provided by the community, i.e. another person than the person who provides the software components. The vetting and/or functional validation by the community might lead to a higher reliability of the vetting and/or functional validation of the software components due to higher independence from vendors, different coverage, etc. The usage of a distributed ledger for storing the vetting and/or functional validation information leads to a highly tamper-resistant and unchangeable vetting and/or functional validation of the software components.

In an embodiment of the method for providing vetting and/or functional validation of software components, all steps of the method are executed by the same person, in particular the first person.

By an execution of all steps of the method by solely the same person, a quantity of the vetting and/or functional validation of software components can be increased. In other words, the time used for providing the vetting and/or functional validation of software components can be decreased.

In an embodiment of the method for providing vetting and/or functional validation of software components, the steps of providing a software component and software component data indicating the software component and writing software component data in a distributed ledger are executed by a first person and the steps of functional validating and/or vetting the software component and providing functional validation and/or vetting data of the software component and writing functional validation and/or vetting data in the distributed ledger are executed by both a first person and at least one second person.

By an execution of the steps of the functional validating and/or vetting, providing functional validation and/or vetting data, and writing functional validation and/or vetting data in the distributed ledger by both a first person and at least one second person, the execution of functional validation and/or vetting can be provided by a community leading to a higher reliability of the vetting and/or functional validation of the software components due to higher independence from vendors, different coverage, etc. The usage of a distributed ledger for storing the vetting and/or functional validation information leads to a highly tamper-resistant and unchangeable vetting and/or functional validation of the software components.

In an embodiment of the method for providing vetting and/or functional validation of software components, the distributed ledger is a public ledger.

The term public ledger as used herein is to be understood broadly and represents any open network that allow anyone to participate in the network. In this type of distributed ledger anyone can join the network and read, write, or participate within the distributed ledger. A public distributed ledger is decentralized and does not have a single entity which controls the network. Data on a public distributed ledger are secure as it is not possible to modify or alter data once they have been validated on the distributed ledger. The public ledger holds information on software components and vetting, and is a decentralized platform, consisting of participants, e.g., from different companies, industrial organizations (e.g., ZVEI, DKE, . . . ) and open-source communities. Participation requires a unique identification as well as ability and willingness to store a local copy of the ledger and to actively participate in the ledger processes, e.g., transaction or block validation. As the ledger is a public ledger, every entity can access the information in a read-only fashion, e.g., using explorers similar to those existing for Bitcoin or Ethereum.

The use of a public ledger leads to a publicly accessible, immutable, and reliable information store without requiring a central authority.

In an embodiment of the method for providing vetting and/or functional validation of software components, the distributed ledger is a private ledger.

The term private ledger as used herein is to be understood broadly and represents any distributed ledger which is managed by a network administrator and participants need consent to join the network, e.g., a private blockchain is a permissioned blockchain. There are one or more entities which control the network, and this leads to reliance on third parties to transact. In this type of distributed ledger only entity participating in the transaction have knowledge about the transaction performed whereas others will not be able to access it, i.e., transactions are private. The use of a private ledger leads to an immutably and reliably documentation of internal software component releases along with validation and/or vetting performed for these components.

In an embodiment of the method for providing vetting and/or functional validation of software components, the distributed ledger is a hybrid ledger. The term hybrid ledger as used herein is to be understood broadly and represents any ledger which uses/has the properties of both a public distributed ledger and a private distributed ledger. This type of ledger often supports higher transaction rates using trusted nodes on a private part and slower transaction rates using trustless nodes on a public part. The use of a hybrid ledger leads to an organizing of internal software components, while allowing access for specific external participants, e.g., to externalize the validation and/or vetting process to trusted/preferred partners while having all actions and results available in a single hybrid ledger.

In an embodiment of the method for providing vetting and/or functional validation of software components, the functional validation and/or vetting data further includes information about the functional validation and/or vetting process.

The term functional validation process as used herein is to be understood broadly and represents any process performing the functional validation. Exemplary, functional validation processes are the execution of functional software test suites, formal verification, automatic proofs for the absence of certain error classes and conformance tests but are not limited thereto.

The term vetting process as used herein is to be understood broadly and represents any process performing the vetting. Exemplary, vetting processes are software signing in app store for mobile applications and desktop applications, publishing signatures on hashes of certain software distributions or public reviews but are not limited thereto.

The providing of information about the functional validation and/or vetting process leads to an improved functional validation and/or vetting because the use of appropriate processes can be provided/displayed/presented and the quality of the functional validation and/or vetting can be broadly estimated.

In an embodiment of the method for providing vetting and/or functional validation of software components, the method further comprises providing control data for controlling at least one process of an industrial control application and/or providing the industrial control application, an operator human machine interface, HMI, for handling alarms and/or an optimization of production parameters based on the provided data written in the distributed ledger.

The term control data as used herein is to be understood broadly and represents any data being able to generally control a process, a device and/or a system. The control data may be data controlling, e.g., a control application and/or the industrial devices. The control data are based on the provided data written in the distributed ledger. The control data can be pre-provided/pre-processed and/or currently provided data. Alternatively, the control data may be data being provided by a control data providing unit.

The providing of control data leads to an automatization for the building of an industrial control application, e.g., to control a process, to provide an operator HMI for handling alarms, or to (semi-)autonomously optimize production parameters. The selection and reliability of the component can be judged based on the verifiable, available information in the public ledger.

In an embodiment of the method for providing vetting and/or functional validation of software components, the writing of the software component, software component data and/or functional validation and/or vetting data of the software component in the distributed ledger includes a proof of validation protocol, a proof of work protocol, proof of stake protocol and/or a proof of authority protocol.

In an embodiment of the method for providing vetting and/or functional validation of software components, the software component and/or the functional validation and/or vetting data are written in the distributed ledger as a transaction.

The term transaction as used herein is to be understood broadly and represents any item being written in/on the distributed ledger. For instance, a transaction about or including a new software component may comprise a (signed) hash value, a status (e.g. created, confirmed), a time, a size, an indication what is contained in a block #, a number of confirmations, inputs like software component name and signed hash, (optional) further inputs like vendor name, software version, versioning scheme, release cycles, and/or values like a pointer to further information relevant to software component name, e.g., product website or download link. For instance, a transaction of a functional validation and/or vetting of a software component may comprise a (signed) hash value; a status (e.g. created, confirmed), a time, a size, an indication what is contained in a block #, a number of confirmations, a related software component, i.e. a hash of new software component transaction, inputs like software version, result of vetting process [e.g., approved, rejected, neutral, . . . ], (optional) further inputs like name of organization having performed the vetting, and/or a value like a pointer to further information on vetting, e.g., detailed setup specification, detailed result report, related vulnerabilities identified (e.g., by linking to CVE).

In an embodiment of the method for providing vetting and/or functional validation of software components, the method further comprises, when the software component data includes specific instance information, providing further control data based on the data written in the distributed ledger for controlling a providing of a software solution.

The term further control data as used herein is to be understood broadly and represents any data controlling based on the vetting and/or functional validation data providing, in particular automatically providing, an application of these software components into/to multiple software solutions.

The term software solution as used herein is to be understood broadly and represents any construct consisting of a plurality of components/software components. For instance, to implement graphical user interfaces, secure communication capabilities, or other features, there are well-known libraries that are used by plenty of software solutions today. Dissecting a software in its individual smallest components is often referred to a creating of a software bill of material (SBOM). Having SBOMs allows vetting software components that are potentially used by multiple software solutions.

By using the vetting and/or functional validation data of a software component and providing further control data, an automatically application of these software components to multiple software solutions can be provided. Therefore, the effort and enhances can be reduced and the quality of vetting and/or functional validating software solutions can be increased.

In a further aspect a system for providing vetting and/or functional validation of software components is presented, comprising: a first receiving unit for receiving a provided software component and software component data indicating the software component; a distributed ledger; a first writing unit for writing the software component data in a distributed ledger; a functional validating and/or vetting unit for functional validating and/or vetting the software component and providing functional validation and/or vetting data of the software component; a second writing unit for writing the functional validation and/or vetting data in the distributed ledger; a providing unit for providing the data written in the distributed ledger to a software component consumer.

In an embodiment of the system for providing vetting and/or functional validation of software components, the system further comprises a third providing unit for providing control data for controlling at least one process of an industrial control application and/or providing the industrial control application, an operator human machine interface, HMI, for handling alarms and/or an optimization of production parameters based on the provided data written in the distributed ledger.

In another embodiment of the method for providing vetting and/or functional validation of software components, the software component is data, which requires validation or vetting in the sense of authenticity, integrity, immutability.

In another embodiment of the method for providing vetting and/or functional validation of software components, the vetting and/or functional validation is performed reproducibly such that an existing vetting and/or functional validation can be reproduced. Thus, an increasing in trust in the published vetting and/or functional validation could be rewarded, e.g., by implementing a cryptocurrency on top of that.

Any disclosure and embodiments described herein relate to the method and the system, lined out above and vice versa. Advantageously, the benefits provided by any of the embodiments and examples equally apply to all other embodiments and examples and vice versa.

As used herein "determining" also includes "initiating or causing to determine," "generating" also includes "initiating or causing to generate" and "providing" also includes "initiating or causing to determine, generate, select, send or receive." "Initiating or causing to perform an action" includes any processing signal that triggers a computing device to perform the respective action.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for providing vetting and/or functional validation of software components, comprising:
   providing, by a first person, a software component and software component data indicating the software component;
   writing, by the first person, the software component data in a distributed ledger;
   functionally validating and/or vetting, by a second person, the software component and providing functional validation and/or vetting data of the software component;
   writing, by the second person, the functional validation and/or vetting data in the distributed ledger; and
   providing, by the second person, the data written in the distributed ledger to a software component consumer; and
   providing control data for controlling at least one process of an industrial control application or providing the industrial control application an operator human machine interface (HMI) for handling alarms, wherein the control data is based on the provided data written in the distributed ledger.

2. The method according to claim 1, wherein the software component data includes identification information and/or specific instance information.

3. The method according to claim 1, wherein the steps of providing the software component and the software component data indicating the software component and writing the software component data in the distributed ledger are executed by the first person and the steps of functional validating and/or vetting the software component and providing the functional validation and/or vetting data of the software component and writing the functional validation and/or vetting data in the distributed ledger are executed by both the first person and the at least one second person.

4. The method according to claim 1, wherein the distributed ledger is a public ledger.

5. The method according to claim 1, wherein the distributed ledger is a private ledger.

6. The method according to claim 1, wherein the distributed ledger is a hybrid ledger.

7. The method according to claim 1, wherein the functional validation and/or vetting data further includes information about a functional validation and/or vetting process.

8. The method according to claim 1, wherein the control data includes an optimization of production parameters based on the provided data written in the distributed ledger.

9. The method according to claim 1, wherein the writing of the software component, the software component data and/or the functional validation and/or vetting data of the software component in the distributed ledger includes a proof of validation protocol, a proof of work protocol, proof of stake protocol and/or a proof of authority protocol.

10. The method according to claim 1, wherein the software component and/or the functional validation and/or vetting data are written in the distributed ledger as a transaction.

11. The method according to claim 1, further comprising, when the software component data includes specific instance information, providing further control data based on the data written in the distributed ledger for controlling a providing of a software solution.

12. A system for providing vetting and/or functional validation of software components, comprising:
   a first receiving unit for receiving a provided software component and software component data indicating the software component;
   a distributed ledger;
   a first writing unit for writing the software component data in a distributed ledger;
   a functional validating and/or vetting unit for functional validating and/or vetting the software component and providing functional validation and/or vetting data of the software component;
   a second writing unit for writing the functional validation and/or vetting data in the distributed ledger;
   a providing unit for providing the data written in the distributed ledger to a software component consumer; and
   a further providing unit for providing control data for controlling at least one process of an industrial control application or providing the industrial control application an operator human machine interface (HMI) for handling alarms, wherein the control data is based on the provided data written in the distributed ledger.

13. The system according to claim 12, wherein the control data includes an optimization of production parameters based on the provided data written in the distributed ledger.

14. The method according to claim 1, wherein the control data is based on the provided data written in the distributed ledger, wherein the providing the control data is triggered by verifying the functional validation and/or vetting data in the distributed ledger, and wherein the providing of the control data leads to an automatization for a building of the industrial control application to control the at least one process, to provide the operator HMI for handling the alarms, or to autonomously optimize production parameters.

* * * * *